United States Patent
Fagans (10) Patent No.: US 9,699,351 B2
(45) Date of Patent: Jul. 4, 2017

(54) DISPLAYING IMAGE THUMBNAILS IN RE-USED SCREEN REAL ESTATE

(75) Inventor: Joshua David Fagans, Redwood City, CA (US)

(73) Assignee: Apple Inc., Cupertino, CA (US)

(*) Notice: Subject to any disclaimer, the term of this patent is extended or adjusted under 35 U.S.C. 154(b) by 1142 days.

(21) Appl. No.: 12/894,063

(22) Filed: Sep. 29, 2010

(65) Prior Publication Data

US 2012/0079416 A1 Mar. 29, 2012

(51) Int. Cl.
- *G06F 3/048* (2013.01)
- *H04N 1/387* (2006.01)
- *G06F 3/0484* (2013.01)
- *H04N 21/431* (2011.01)
- *G06F 17/30* (2006.01)

(52) U.S. Cl.
CPC ....... *H04N 1/3875* (2013.01); *G06F 3/04842* (2013.01); *G06F 3/04845* (2013.01); *G06F 17/30274* (2013.01); *H04N 21/4316* (2013.01)

(58) Field of Classification Search
CPC .............. H04N 1/3875; H04N 21/4316; G06F 3/04845; G06F 3/04842; G06F 17/30274
USPC ....................................................... 715/781
See application file for complete search history.

(56) References Cited

U.S. PATENT DOCUMENTS

| | | | |
|---|---|---|---|
| 5,736,974 A | 4/1998 | Selker | |
| 6,700,612 B1* | 3/2004 | Anderson et al. | 348/333.11 |
| 6,961,908 B2 | 11/2005 | Phillips | |
| 7,178,111 B2* | 2/2007 | Glein et al. | 715/848 |
| 7,434,177 B1 | 10/2008 | Ording et al. | |
| 7,760,187 B2 | 7/2010 | Kennedy | |
| 8,205,172 B2* | 6/2012 | Wong et al. | 715/855 |
| 2004/0175764 A1* | 9/2004 | Nishiyama et al. | 435/7.2 |
| 2006/0090141 A1* | 4/2006 | Loui et al. | 715/764 |
| 2006/0119619 A1* | 6/2006 | Fagans et al. | 345/619 |
| 2006/0224993 A1* | 10/2006 | Wong et al. | 715/800 |
| 2006/0265417 A1* | 11/2006 | Amato et al. | 707/102 |
| 2007/0174790 A1* | 7/2007 | Jing et al. | 715/838 |
| 2007/0186189 A1* | 8/2007 | Schiller | 715/838 |
| 2007/0198476 A1* | 8/2007 | Farago et al. | 707/3 |
| 2009/0019369 A1* | 1/2009 | Borovsky et al. | 715/736 |
| 2009/0031246 A1 | 1/2009 | Cowtan et al. | |

(Continued)

OTHER PUBLICATIONS http://www.brothersoft.com/photo-pilot-250695.html, Download Free Photo Pilot, Photo Pilot 0.9.2.19 Beta Download, Sep. 15, 2010, 3 pages.

(Continued)

*Primary Examiner* — Patrick Riegler
(74) *Attorney, Agent, or Firm* — Fish & Richardson P.C.

(57) ABSTRACT

Methods, system and computer-readable media are disclosed to facilitate presenting a plurality of digital images in a user interface window that includes an image display region and at least one other region available for re-use, receiving input from a user indicating a selection of at least one of the digital images, and modifying the presentation of the user interface window to present the selected at least one digital image in the image display region and to present the non-selected digital images as thumbnail images displayed within the at least one other region available for re-use. The thumbnail images displayed in the re-use region may be selectively displayed in a more prominent manner to facilitate user interaction.

24 Claims, 5 Drawing Sheets

(56) References Cited

U.S. PATENT DOCUMENTS

2009/0164944 A1* 6/2009 Webster et al. ............... 715/838
2009/0222420 A1* 9/2009 Hirata ............................... 707/3
2009/0249210 A1 10/2009 Sheldon et al.
2009/0303246 A1* 12/2009 Tsuda ............................ 345/592
2010/0095219 A1* 4/2010 Stachowiak et al. ......... 715/745
2010/0162171 A1* 6/2010 Felt et al. ..................... 715/835
2010/0171763 A1 7/2010 Bhatt et al.
2010/0287492 A1* 11/2010 Reifman et al. .............. 715/781
2010/0333017 A1* 12/2010 Ortiz ............................ 715/800

OTHER PUBLICATIONS http://img.brothersoft.com/screenshots/softimage/p/photo_pilot-250695-1245724873.jpeg, Photo Pilot screen shot, Sep. 15, 2010, 1 page.

* cited by examiner

DISPLAYING IMAGE THUMBNAILS IN RE-USED SCREEN REAL ESTATE

BACKGROUND

In general, this document describes systems and techniques for viewing, editing and/or otherwise manipulating electronic images such as digital or digitized photographs.

Digital photography has simplified taking, viewing, and printing photographs. Photographs can be taken either using high-end equipment such as digital single lens reflex (SLR) cameras, low resolution cameras including point-and-shoot cameras and cellular telephone instruments with suitable capabilities. Photographs can be transferred either individually as files or collectively as folders containing multiple files from the cameras to other media including computers, printers, and storage devices.

Image manipulation and management software applications, such as iPhoto (manufactured by Apple Inc. of Cupertino, Calif.), can be used to arrange, display, and edit digital photographs obtained from a camera or any other electronic image in a digital format. Such software applications provide a user in possession of a large repository of photographs with the capabilities to organize, view, and edit the photos.

Typically, such software applications provide a Graphical User Interface (GUI) with which users can view and manipulate their photos. Depending on context and setting, a user's photos can be displayed either at or near full size or as image "thumbnails"—versions of the photos that are reduced significantly in sized to allow many of them to appear together in the GUI.

SUMMARY

In one aspect, methods, system and computer-readable media are disclosed to facilitate presenting a plurality of digital images in a user interface window that includes an image display region and at least one other region available for re-use, receiving input from a user indicating a selection of at least one of the digital images, and modifying the presentation of the user interface window to present the selected at least one digital image in the image display region and to present the non-selected digital images as thumbnail images displayed within the at least one other region available for re-use.

In one or more implementations, the re-use region can be a border region of the user interface window. More generally, the re-use region can an unused portion of the user interface window or a portion of the user interface window that is used for a different purpose in a different context.

The selected image can be presented both in the image display region and as one of the thumbnail images displayed within the re-use region. The thumbnail images can be presented within a thumbnail region that is embedded within a border region of the user interface window. Only a portion of the non-selected images may be visible as thumbnails within the thumbnail region. In that case, the thumbnail region can include one or more controls with which the user can interact to bring non-visible thumbnail images into view. More generally, one or more visual cues for the user can be provided indicating that additional thumbnail images not currently visible are available through interaction with the thumbnail region.

Further input can be received from the user indicating that interaction with one or more of the thumbnail images is desired by the user, in response to which the thumbnail images can be displayed in a more prominent manner to facilitate user interaction. Displaying the thumbnail images in a more prominent manner may involved displaying the thumbnail images with enlarged size, e.g., at a size such that they overlap with the selected image displayed in the image display region, and/or at a size such that the thumbnail images are displayed at least partially outside of the re-use region. The thumbnail images can be displayed in a more prominent manner only while the thumbnail region is in an active state. For example, display of the thumbnail images in a more prominent manner can terminate upon receiving input from the user indicating that interaction with one or more of the thumbnail images is no longer desired by the user. More generally, thumbnail images displayed in the re-use region may be selectively displayed in a more prominent manner to facilitate user interaction.

The systems and techniques described here may provide one or more of the following potential advantages. For example, by having a persistent thumbnail display region within the GUI window, all of the images in the image set under consideration remain conveniently and readily available to the application user, without having to return to a previous selection view and without having to invoke a separate function or pop-up window. At the same time, because the image thumbnails appear in a GUI region that is otherwise un-used, or alternatively, used for a different purpose in a different context, (e.g., the border of the GUI window), they are effectively re-using valuable screen real estate and thus not, for example, unduly adding to screen clutter, nor reducing the size of a main image currently being viewed nor otherwise sacrificing GUI space for the purpose of presenting an image thumbnail region. By having the thumbnail region capable of adopting two different states—for example, an inactive state and an active state, the application minimizes the obtrusiveness of, and distraction caused by, the thumbnail region when it's not being used, while at the same making the thumbnail region easier to see and use when it is needed.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
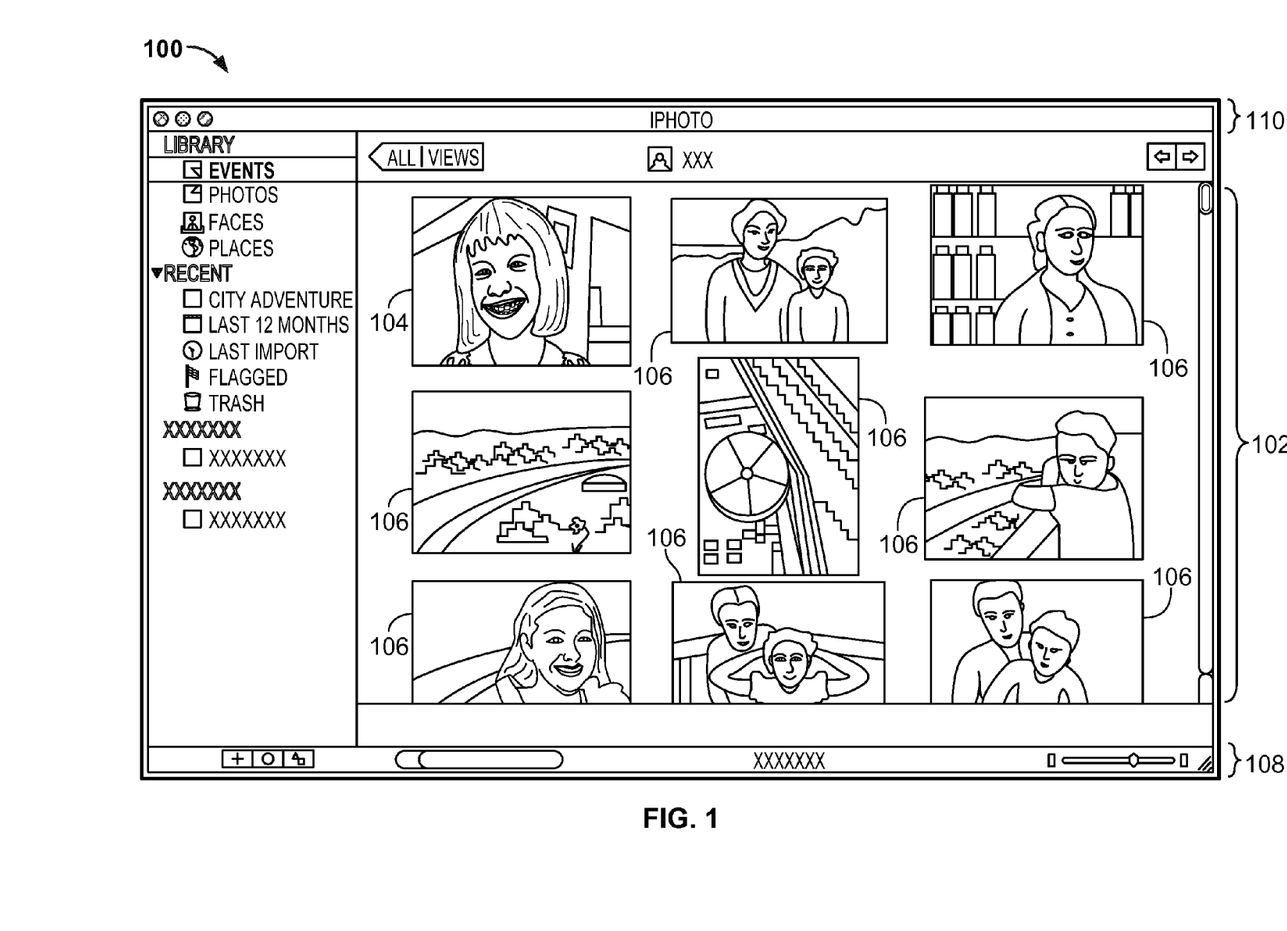
FIGS. 1-3 are screenshots showing various views of a graphical user interface of a digital image manipulation and management application.

FIG. 1 depicts an example of a GUI window 100 for a digital image editing and management application. Among other elements, the GUI window 100 includes an image display region 102 in which the application user's photos are displayed, for example, the images indicated as 104 and 106, and a border region(s) 108 and 110, also sometimes referred to as the "frame," "chrome," or "metal" of the GUI window 100. As shown, this particular GUI window 100 has a top frame 110 and a bottom frame 108, although depending on design objectives and preferences of the application designer, a GUI window could have frame elements along any combination of the four edges of the GUI window (that is—top, bottom, left, right). Typically, a GUI window's frame portions are either left blank (i.e., solid colored) for aesthetic reasons or may include small application controls or other application affordances.

In FIG. 1, the user's photos 104, 106 are shown at a size such that several of them can be viewed by the user at the same time. If, however, the user wishes a larger view of a certain photo, for example, to edit it to remove redeye or the like, the user can double-click (or equivalent gesture) on the desired photo to enlarge it, albeit at the expense of viewing the non-selected images, which typically are hidden from view following selection and enlargement of the desired image.

Figure 2:
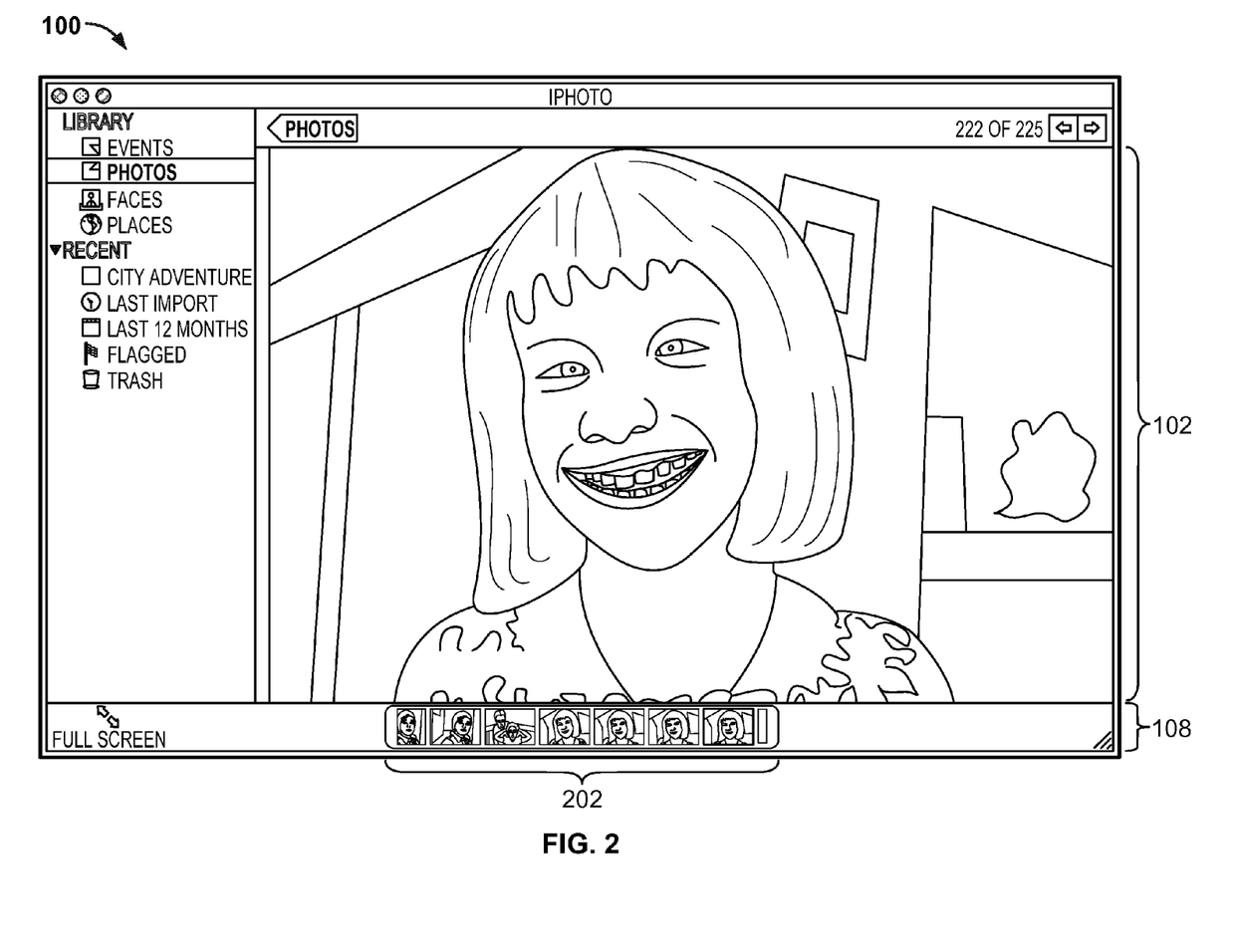

FIG. 2 shows an exemplary appearance of the GUI window 100 after the application user has double-clicked on, or otherwise selected (e.g., through touch-based gestures on a touch-based computing platform), image 104. As shown, image 104 is displayed in an enlarged format to effectively occupy the entirety, or nearly so, of the image display region 102. At the same time, the non-selected images 106 are not entirely lost from view but rather (along with the selected image) are rendered into thumbnails images and are displayed adjacent one another in a thumbnail region 202, which in the example depicted is embedded in (e.g., displayed within) the GUI window's frame or border region 108. Consequently, the non-selected images remain conveniently and readily available to the user in case he or she wants to change the selection to a different image without having to perform the extra step of first returning to the view shown in FIG. 1. Moreover, because the thumbnails are displayed within a region of the GUI that is otherwise unused, or used for a different purpose in a different context, (in this example, the frame 108, which is a region that is typically reserved either for blank space or GUI controls), the size of the image display region 102 is maximized in that it need not be reduced in size to facilitate display of thumbnail region 202. In this manner, the thumbnail region 202 effectively re-uses valuable screen real estate and thus, for example, helps prevent unduly adding to screen clutter, having to reduce the size of a main image currently being viewed and/or otherwise sacrificing GUI space for the purpose of presenting an image thumbnail region. In general, the thumbnail region 202 could be located, depending on GUI design preference and objectives, essentially anywhere within the GUI that would make use of otherwise unused screen real estate and/or re-use screen real estate that is used for a different purpose and/or in a different context. As used herein, the term "re-used" in intended to emcompass the situation both in which the image thumbnails are displayed in an otherwise unused portion of the GUI window and in which the image thumbnails are displayed in a portion of the GUI window that is used for a different purpose in a different context or state.

In the state shown in FIG. 2, the thumbnails in the thumbnail region 202 are shown in an inactive state, meaning that they appear relatively small (and optionally with image display characteristics to minimize distraction, such as decreased opacity, reduced brightness, muted colors or the like) such that they are unobtrusive and otherwise less distracting to the user while he or she is viewing or interacting with the selected image displayed in image display region 102. Although the thumbnail region 202 is depicted in FIG. 2 as being displayed in the bottom border region 108, alternatively a designer or user could opt to have it displayed in a different border region, such as the top, left or right. In addition the appearance and size of the thumbnail region 202, as well as the thumbnails depicted therein, can generally be altered according to personal preferences.

Figure 3:
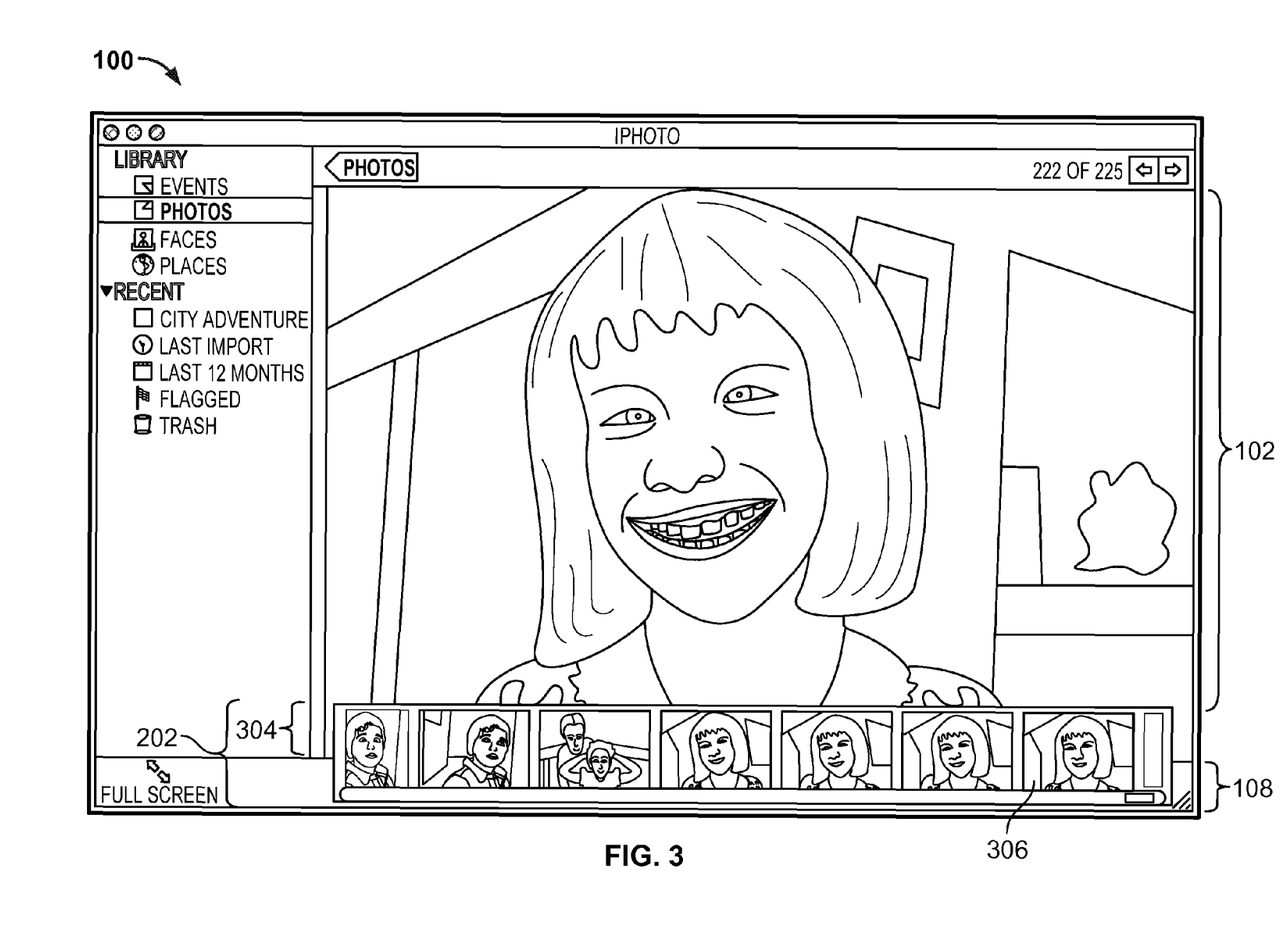

As shown in FIG. 3, when activated (e.g., in response to the user's moving a position indicator such as the cursor or other pointing device such as the user's finger or a stylus in a touch-based computing environment over any portion of the image thumbnail region) the thumbnail region 202, and thus the thumbnails depicted therein, become more prominent and thus easier for the user to see and interact with. Alternatively, or in addition, activation of the image thumbnail region could be achieved through other user interface techniques such as touch-based gestures, keyboard-based commands or shortcuts, menu commands or the like. Prominence of the image thumbnail region can be achieved in various ways, e.g., by increasing the size, color, brightness, opacity, and the like of the thumbnail region 202 or the thumbnails themselves, or both. In the example shown in FIG. 2, the thumbnail region 202 is made more prominent upon activation by enlarging it to the point where it overlaps, and thus partially obscures, the image displayed in the image display region 102, in this case by an overlap amount 304. In general, this overlap and the resulting obscuring of the image display region 102 will not pose difficulties for the user because, in the active state of the thumbnail region 202, the user likely will be focusing on the thumbnail images in region 202 and not the selected image in region 102. Alternatively, if the overlap 304 is considered undesirable, the application GUI could be designed instead to reduce the size of the image in region 102 proportionally to accommodate the enlarged thumbnail region 202 while in its active state.

While in the active state, the thumbnail region 202 provides indicia that help facilitate user interaction. As shown in FIG. 3, for example, a highlight box 306 appears around the currently selected image—that is, the image currently being displayed in image display region 102. Using standard GUI gestures and techniques, the user can select a different thumbnail in the thumbnail region 202, thereby resulting in the newly selected image being displayed in the image displayed region, and resulting in the highlight box 306 being displayed around the corresponding thumbnail in the thumbnail display region 202.

Depending on the number of images in the user's image set, the thumbnail region 202 may not be large enough to display thumbnails for all of the user's images. In that case, the thumbnail region 202 can be implemented as a scrolling region in which the user can use standard GUI gestures to scroll left or right to access image thumbnails not currently displayed in the thumbnail region 202. When only a portion of the complete image set is displayed in the thumbnail region 202, graphical indicia can be used to provide visual cues to the user that additional thumbnail images are available but out of view on either the left or right ends, or both, of the thumbnail region 202. For example, as shown in FIG. 2, the thumbnail region 202 has shading at both of its ends, giving the appearance of a gradient that indicates the availability of additional but presently out-of-sight image thumbnails. Additional or different graphical indicia than those described above can be used to indicate the selected thumbnail, the availability of additional thumbnail images or the like (e.g., graphical indicia that simulate a three-dimensional (3D) object such as a revolving carousel that can be virtually rotated by the user to expose addition image thumbnails).

When the user is finished interacting with the thumbnail region 202, it can be deactivated, for example, by moving the cursor (or other position indicator) to a point in the GUI window 100 outside of the thumbnail region 202, or by any other suitable user interface technique. When that occurs, the thumbnail region 202 becomes inactive and returns to its inactive state as shown in FIG. 2.

Figure 4:
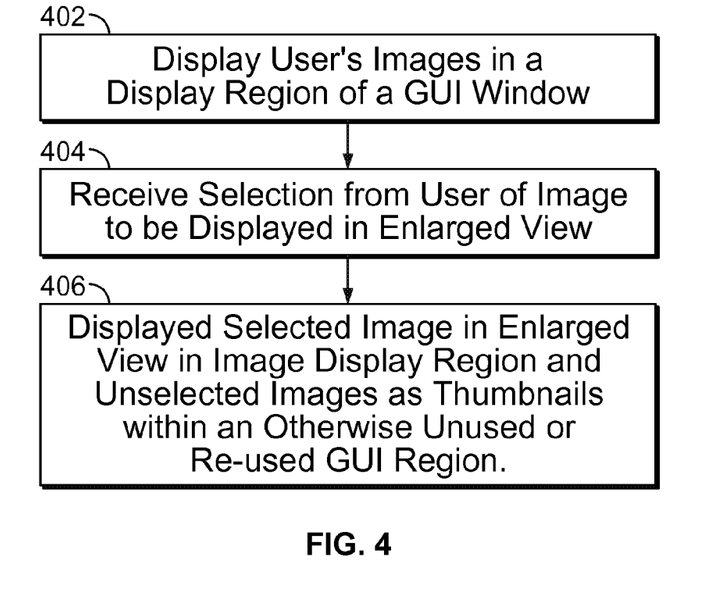
FIGS. 4-5 are flowcharts of processes facilitated by a digital image manipulation and management application.

FIG. 4 is a flowchart of a process for making image thumbnails corresponding to images available in a current image set readily and conveniently available to a user of an image editing and managing application. Initially, at 402, some or all of a user's images, or at least those belonging to a specified set (e.g., corresponding to an event, a filter keyword, a folder or the like), are displayed in an image display region of a GUI window. Next, at 404, the application receives a selection of an image for display in an enlarged view, for example, for editing or better viewing, in the image display region. Concurrent with displaying the selected image in an enlarged view, at 406, the application displays thumbnails of at least a portion of the images in the image set in a re-used region of the GUI window—that is, a GUI region that is either otherwise unused or to make re-use of a GUI window region that is used for a different purpose in a different context or state (e.g., a GUI window border region or the like). The visible thumbnails typically include a thumbnail of the selected image currently being displayed in the image display region.

Figure 5:
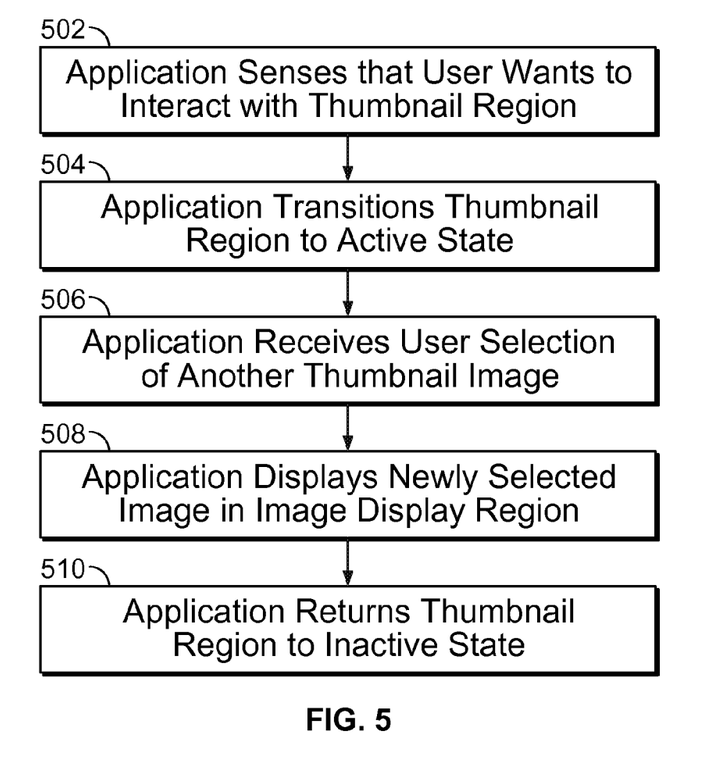

FIG. 5 is a flowchart of a process for enabling a user of an image editing and managing application to interact with image thumbnails displayed in a thumbnail region located in a re-used (which as noted above, includes otherwise unused portions) of the GUI window. At 502, the application senses that the user wants to interact with the thumbnail region, e.g., by detecting that the user has positioned the cursor (or other position indicator) over any point within the thumbnail region. In response, at 504, the application transitions the thumbnail region to its active state, and enlarges the thumbnail region to make it easier to view and more readily accessible to the user. At 506, the application receives the user's selection, for example, of a thumbnail corresponding to a different image than that displayed in the image displayed region. In response, at 508, the application changes the display such that the newly selected image is displayed in the image display region. At 510, the application determines that the user has completed interaction with the thumbnail region, e.g., by determining that the cursor position (or other position indicator) is outside the thumbnail region, and returns the thumbnail region to its inactive state and thus to its reduced size and reduced prominence.

Figure 6:
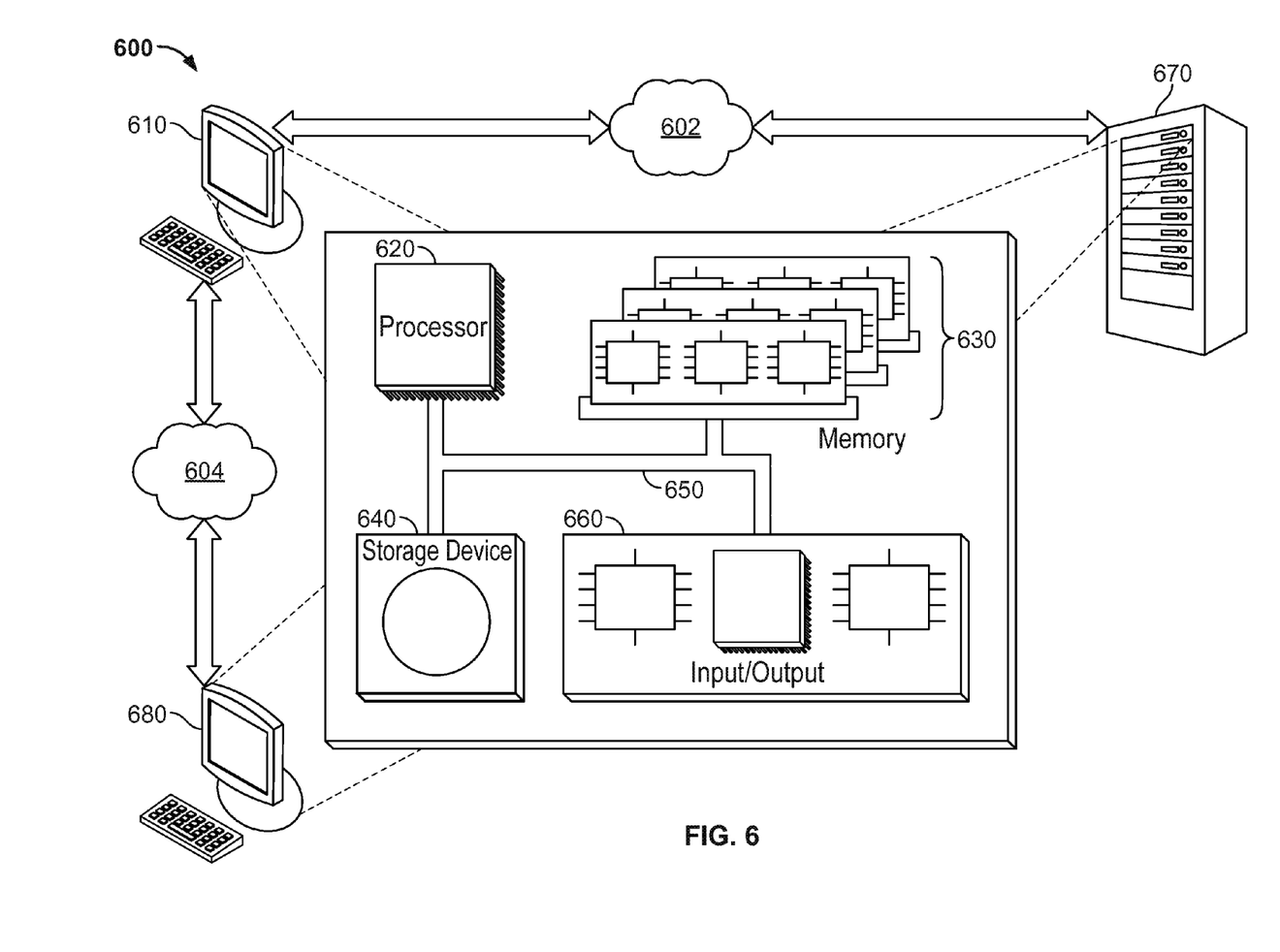
FIG. 6 is a block diagram of a computing device and system that can be used in connection with computer-implemented methods and systems described in this document.

FIG. 6 shows an example computing device 600 that potentially could be used to implement the systems and techniques described in this document. Computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 600 includes a processor 620, memory 630, a storage device 640, a high-speed interface 650 connecting to memory 630. The computing device can also include high-speed expansion ports (not shown), and a low speed interface (not shown) connecting to low speed bus (not shown) and storage device 640. Each of the components 620, 630, 640, and 650 are interconnected using various busses, and can be mounted on a common motherboard or in other manners as appropriate. The processor 620 can process instructions for execution within the computing device 600, including instructions stored in the memory 630 or on the storage device 640 to display graphical information for a GUI on an external input/output device, such as a display 610 coupled to an input/output interface on computing device 600. In other implementations, multiple processors and/or multiple buses can be used, as appropriate, along with multiple memories and types of memory.

Also, multiple computing devices 600 can be connected over a network 604, with each device providing portions of the necessary operations (e.g., as a server bank, a group of blade servers, or a multi-processor system). Network 604 can take the form of direct connections, e.g., USB, SCSI, or a connection via the internet. Further, computing device 600 can be connected to remote server 670 through network connection 602. Network connection 602 can be a connection through the internet.

The memory 630 stores information within the computing device 600. In various implementations, the memory 630 can include a computer-readable medium, a volatile memory unit or units and/or a non-volatile memory unit or units. The storage device 640 is capable of providing mass storage for the computing device 600. In one implementation, the storage device 640 is a computer-readable medium. In various different implementations, the storage device 640 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 630, the storage device 640, or memory on processor 620.

The high speed controller 650 manages bandwidth-intensive operations for the computing device 600, while the low speed controller manages lower bandwidth-intensive operations. Such allocation of duties is exemplary only. In one implementation, the high-speed controller 650 is coupled to memory 630, display 610 (e.g., through a graphics processor or accelerator), and to high-speed expansion ports (not shown), which can accept various expansion cards (not shown). In the implementation, low-speed controller (not shown) is coupled to storage device 640 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, a composition of matter affecting a machine-readable entity, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. While this document contains many specifics, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Only a few implementations and examples are described and other implementations, enhancements and variations can be made based on what is described and illustrated in this application. Accordingly, other implementations are within the scope of the following claims.

What is claimed is:

1. A method performed by one or more processes executing on a computing apparatus, the method comprising:
   presenting a plurality of digital images in an image display region included in a user interface window, wherein the user interface window includes a region separate from the image display region;
   receiving input indicating a selection of a digital image presented in the image display region; and in response to receiving the input indicating the selection of the digital image:
presenting a larger version of the selected digital image in the image display region, the larger version of the selected digital image having an image display characteristic including at least one of an opacity or a brightness,
removing the non-selected digital images from the image display region,
presenting smaller versions of the non-selected digital images within the region separate from the image display region, and
presenting the region separate from the image display region with an image display characteristic that is less than a corresponding image display characteristic of the larger version.

2. The method of claim 1, wherein the separate region comprises an unused region that is outside of and borders the image display region.

3. The method of claim 1, wherein the separate region comprises application controls, and wherein presenting smaller versions of the non-selected digital images within the separate region comprises determining that the application controls are used for a purpose different from presenting the digital images in the user interface window.

4. The method of claim 1, wherein presenting smaller versions of the non-selected digital images within the separate region comprises presenting each smaller version of a non-selected digital image as a thumbnail in a thumbnail region in the separate region and wherein only a portion of the non-selected images are visible as thumbnails in the thumbnail region.

5. The method of claim 4 further comprising providing one or more visual cues for the user indicating that additional smaller versions of the non-selected digital images not currently visible are available through interaction with the separate region.

6. The method of claim 1 further comprising: receiving input indicating that interaction with one or more of the thumbnail images is desired; and displaying the separate region and the smaller versions of the non-selected digital images in a more prominent manner to facilitate interaction.

7. The method of claim 6 wherein displaying the smaller versions of the non-selected digital images in a more prominent manner comprises enlarging sizes of the smaller versions of the non-selected digital images, and reducing a size of the larger version of the selected digital image to accommodate the enlarged sizes of the smaller versions of the non-selected digital images.

8. The method of claim 6 wherein the separate region has at least one of a brightness or opacity, and wherein displaying the separate region in a more prominent manner comprises increasing the at least one of the brightness or opacity of the separate region.

9. A system comprising:
a processor; and
a computer-readable medium storing instructions executable by the processor to perform operations comprising:
presenting a plurality of digital images in an image display region included in a user interface window, wherein the user interface window includes a region separate from the image display region;
receiving input indicating a selection of a digital image presented in the image display region; and
in response to receiving the input indicating the selection of the digital image:
presenting a larger version of the selected digital image in the image display region, the larger version of the selected digital image having an image display characteristic including at least one of an opacity or a brightness and a color,
removing the non-selected digital images from the image display region,
presenting smaller versions of the non-selected digital images within the region separate from the image display region, and,
presenting the region separate from the image display region with an image display characteristic that is less than a corresponding image display characteristic of the larger version.

10. The system of claim 9, wherein the separate region comprises an unused region that is outside of and borders the image display region.

11. The system of claim 9, wherein the separate region comprises application controls, and wherein presenting smaller versions of the non-selected digital images within the separate region comprises determining that the application controls are used for a purpose different from presenting the digital images in the user interface window.

12. The system of claim 9, wherein presenting smaller versions of the non-selected digital images within the separate region comprises presenting each smaller version of a non-selected digital image as a thumbnail in a thumbnail region in the separate region and wherein only a portion of the non-selected images are visible as thumbnails in the thumbnail region.

13. The system of claim 12, the operations further comprising providing one or more visual cues for the user indicating that additional smaller versions of the non-selected digital images not currently visible are available through interaction with the separate region.

14. The system of claim 9 wherein the computer system is further configured to perform operations comprising: receiving input indicating that interaction with one or more of the smaller versions of the non-selected digital images is desired; and displaying the separate region and the smaller versions of the non-selected digital images in a more prominent manner to facilitate interaction.

15. The system of claim 14 wherein displaying the smaller versions of the non-selected digital images in a more prominent manner comprises enlarging sizes of the smaller versions of the non-selected digital images, and reducing a size of the larger version of the selected digital image to accommodate the enlarged sizes of the smaller versions of the non-selected digital images.

16. The system of claim 14 wherein the separate region has at least one of a brightness or opacity, and wherein displaying the separate region available for re-use in a more prominent manner comprises increasing the at least one of the brightness or opacity of the separate region.

17. A non-transitory, computer-readable medium bearing instructions to cause a computer system to perform operations comprising:
presenting a plurality of digital images in an image display region included in a user interface window, wherein the user interface window a region separate from the image display region;
receiving input indicating a selection of a digital image presented in the image display region; and
in response to receiving the input indicating the selection of the digital image:
presenting a larger version of the selected digital image in the image display region, the larger version of the selected digital image having an image display characteristic including at least one of an opacity or a brightness, removing the non-selected digital images from the image display region, presenting smaller versions of the non-selected digital images within the region, and presenting the region with an image display characteristic that is less than a corresponding image display characteristic of the larger version.

18. The medium of claim 17, wherein the separate region comprises an unused region that is outside of and borders the image display region.

19. The medium of claim 17 wherein the separate region comprises application controls, and wherein presenting smaller versions of the non-selected digital images within the separate region comprises determining that the application controls are used for a purpose different from presenting the digital images in the user interface window.

20. The medium of claim 17, wherein presenting smaller versions of the non-selected digital images within the separate region comprises presenting each smaller version of a non-selected digital image as a thumbnail in a thumbnail region in the separate region and wherein only a portion of the non-selected images are visible as thumbnails in the thumbnail region.

21. The medium of claim 20, the operations further comprising providing one or more visual cues for the user indicating that additional smaller versions of the non-selected digital images not currently visible are available through interaction with the separate region.

22. The medium of claim 17 wherein the medium further bears instructions to perform operations comprising: receiving input indicating that interaction with one or more of the smaller versions of the non-selected digital images is desired; and displaying the separate region and the smaller versions of the non-selected digital images in a more prominent manner to facilitate interaction.

23. The medium of claim 22 wherein displaying the smaller versions of the non-selected digital images in a more prominent manner comprises enlarging sizes of the smaller versions of the non-selected digital images, and reducing a size of the larger version of the selected digital image to accommodate the enlarged sizes of the smaller versions of the non-selected digital images.

24. The medium of claim 17 wherein presenting smaller versions of the non-selected digital images within the separate region comprises presenting each smaller version of a non-selected digital image with an image display characteristic that is less than the corresponding image display characteristic of the larger version.

* * * * *

UNITED STATES PATENT AND TRADEMARK OFFICE
CERTIFICATE OF CORRECTION

PATENT NO. : 9,699,351 B2  
APPLICATION NO. : 12/894063  
DATED : July 4, 2017  
INVENTOR(S) : Joshua David Fagans Page 1 of 1

It is certified that error appears in the above-identified patent and that said Letters Patent is hereby corrected as shown below:

In the Claims

Column 10, Line 60, after "window" insert -- includes --.

Signed and Sealed this  
Twelfth Day of March, 2019

Andrei Iancu  
*Director of the United States Patent and Trademark Office*